(12) United States Patent
Drummond et al.

(10) Patent No.: US 10,181,904 B2
(45) Date of Patent: Jan. 15, 2019

(54) DATA-AIDED CHROMATIC DISPERSION ESTIMATION

(71) Applicant: Xieon Networks S.à.r.l., Senningerberg (LU)

(72) Inventors: Miguel Drummond, Estarreja (PT); Bernhard Spinnler, Oberhaching (DE); Stefano Calabro, Munich (DE)

(73) Assignee: XIEON NETWORKS S.A.R.L., Senningerberg (LU)

( * ) Notice: Subject to any disclaimer, the term of this patent is extended or adjusted under 35 U.S.C. 154(b) by 0 days.

(21) Appl. No.: 15/507,120

(22) PCT Filed: Jul. 9, 2015

(86) PCT No.: PCT/EP2015/065666
§ 371 (c)(1),
(2) Date: Feb. 27, 2017

(87) PCT Pub. No.: WO2016/037729
PCT Pub. Date: Mar. 17, 2016

(65) Prior Publication Data
US 2017/0279531 A1  Sep. 28, 2017

(30) Foreign Application Priority Data

Sep. 12, 2014 (EP) .................................... 14184617

(51) Int. Cl.
*H04B 10/2507* (2013.01)
*H04B 10/69* (2013.01)
*H04B 10/2513* (2013.01)

(52) U.S. Cl.
CPC . *H04B 10/25073* (2013.01); *H04B 10/25133* (2013.01); *H04B 10/6971* (2013.01)

(58) Field of Classification Search
CPC .......... H04B 10/25073; H04B 10/6971; H04B 10/25133
See application file for complete search history.

(56) References Cited

U.S. PATENT DOCUMENTS

| 6,798,500 B2 | 9/2004 | Wilson et al. |
| 2012/0128376 A1 | 5/2012 | Sun et al. |

(Continued)

FOREIGN PATENT DOCUMENTS

| EP | 2639977 A1 | 9/2013 |
| EP | 2709328 A2 | 3/2014 |

OTHER PUBLICATIONS

International Search Report and Written Opinion, PCT/EP2015/065666, dated Oct. 8, 2015, 11 pages.

(Continued)

*Primary Examiner* — Leslie C Pascal
(74) *Attorney, Agent, or Firm* — Nelson Mullins Riley & Scarborough LLP

(57) ABSTRACT

The present invention relates to performing chromatic dispersion estimation in a receiver of an optical communication system. Here, the signal received by the receiver includes frames, each comprising a training portion and a data portion. The training portion comprises a plurality of identical pattern sequences. Different settings are applied to an equalizer to generate a plurality of equalized signals from at least one of the received frames. Then, at least one correlation value is calculated between a first pattern sequence and a second pattern sequence of the equalized signals and a final correlation value is derived from the respective correlation values. The setting of the equalizer corresponding to the equalized signal providing the highest final correlation value is selected to provide the chromatic dispersion estimation.

15 Claims, 4 Drawing Sheets

(56) References Cited

U.S. PATENT DOCUMENTS

Figure 1:
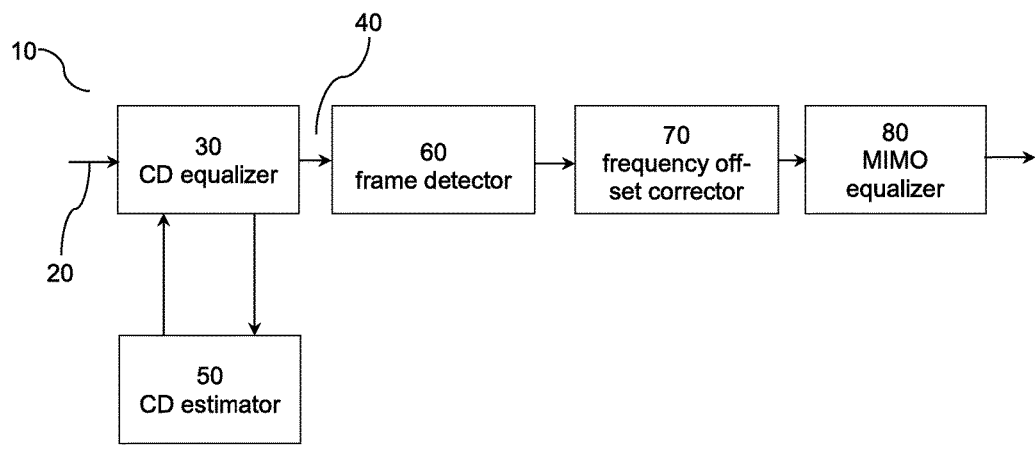

| | | |
|---|---|---|
| 2012/0213512 A1 | 8/2012 | Stojanovic |
| 2012/0281981 A1 | 11/2012 | Le Taillandier De Gabory et al. |
| 2013/0045004 A1 | 2/2013 | Geyer |

OTHER PUBLICATIONS

Hauske, F. N. et al., "Optical Performance Monitoring in Digital Coherent Receivers," Journal of Lightwave Technology, vol. 27(16): 3623-3631 (2009).

Hauske, F.N. et al., "Frequency Domain Chromatic Dispersion Estimation," IEEE 2010, OSA / OFC/NFOEC 2010, 3 pages.

Hauske, F.N. et al., "Precise, Robust and Least Complexity CD estimation," Optical Society of America, OSA/OFC/NFOEC 2011, 3 pages.

Kuschnerov, M et al., "Adaptive Chromatic Dispersion Equalization for Non-Dispersion Managed Coherent Systems," IEEE, 2009 OSA/OFC/NFOEC 2009, 3 pages.

Sui, Qi et al., "Fast and Robust Blind Chromatic Dispersion Estimation Using Auto-Correlation of Signal Power Waveform for Digital Coherent Systems," Journal of Lightwave Technology, vol. 31 (2):306-312 (2013).

Wymeersch, H., et al., "Maximum-Likelihood-Based Blind Dispersion Estimation for Coherent Optical Communication," Journal of Lightwave Technology, vol. 30(18) 2976-2982 (2012).

DATA-AIDED CHROMATIC DISPERSION ESTIMATION

CROSS REFERENCE TO RELATED APPLICATIONS

This application is a 35 U.S.C. 371 national stage filing of International Application No. PCT/EP2015/065666, filed on Jul. 9, 2015, which claims priority to European Patent Application No. 14184617.0 filed on Sep. 12, 2014. The contents of the aforementioned applications are hereby incorporated by reference in their entireties.

FIELD OF THE INVENTION

The present invention is in the area of coherent fiber optical communication and relates to a receiver and a method of performing chromatic dispersion estimation in an optical communication system.

BACKGROUND OF THE INVENTION

Current state-of-the-art transceivers in fiber optical communication systems can produce data streams with a bit rate up to 200 Gb/s. Such high bit rate signals can for example be generated using a classic serial on-off keying transmission, but this has two main disadvantages. First, such an approach requires large-bandwidth electronics. Second, the spectral efficiency of the resulting optical signal is very low, which generally leads to an unacceptable spectral occupancy.

In view of these disadvantages, advanced modulation formats such as quadrature phase shift keying (QPSK) and 16 quadrature amplitude modulation (16 QAM) have been adopted for higher bit rates. Here, the symbol rate is lower than the bit rate, leading to a higher spectral efficiency than provided by serial on-off keying transmission, and the spectral efficiency can be additionally doubled by performing polarization-division multiplexing (PDM).

Such advanced modulation formats combined with PDM require coherent detection, as all dimensions of the optical field must be analyzed for proper signal demodulation. Besides enabling the demodulation of advanced modulation formats, coherent detection has two additional benefits: increased receiver sensitivity and possibility of digital impairment compensation. Digital compensation of transmission impairments such as chromatic dispersion (CD) and polarization-mode dispersion (PMD) has been extensively investigated and has been applied in commercially available transponders. An effective compensation of the respective impairments requires precise impairment estimation, commonly referred to as channel estimation.

Different algorithms for channel estimation in coherent optical transceivers have been proposed and implemented using for example digital signal processing (DSP) architectures. For example, FIG. 1 illustrates a corresponding digital signal processing (DSP) architecture of a channel estimator 10. In this architecture, a digitalized optical signal 20 is processed by a bulk chromatic dispersion (CD) equalizer 30. Commonly, this type of equalizer is implemented in the frequency domain and is then referred to as Frequency Domain Equalizer (FDE) 30. The Frequency Domain Equalizer (FDE) 30 coarsely compensates the chromatic dispersion (CD), leaving the resulting signal 40 with a residual chromatic dispersion (CD). The resulting signal 40 should have sufficiently low residual chromatic dispersion (CD) in order to enable the subsequent steps of frame detection 60, frequency offset correction 70, and finally MIMO equalization 80 to be performed in a robust manner.

As illustrated in FIG. 1, a chromatic dispersion estimator 50 receives information from the Frequency Domain Equalizer (FDE) 30, and based on this information, the chromatic dispersion estimator 50 configures the Frequency Domain Equalizer (FDE) 30. In other words, the amount of residual chromatic dispersion CD left by the Frequency Domain Equalizer (FDE) 30 largely depends on the performance of the chromatic dispersion estimator 50. Moreover, since the performance of the subsequent stages of frame detection 60, frequency offset correction 70, and finally MIMO equalization 80 located after the Frequency Domain Equalizer (FDE) 30 depends on the Frequency Domain Equalizer (FDE) 30, the chromatic dispersion estimator 50 is conventionally located immediately before or after the Frequency Domain Equalizer (FDE) 30 for improved performance A conventional chromatic dispersion estimator 50 is based on the constant-modulus algorithm (CMA), as for example described in Kuschnerov, Maxim, et al. "*Adaptive chromatic dispersion equalization for non-dispersion managed coherent systems.*" *Optical Fiber Communication Conference. Optical Society of America*, 2009. The constant-modulus algorithm (CMA) assumes that all constellation symbols of the received signal 20 have identical amplitudes, such as for example QPSK modulation symbols, since all symbols of the QPSK constellation have identical amplitudes. In other words, the constant-modulus algorithm (CMA) considers the amplitude (modulus) of such a signal to be constant as long as it is not subject to any impairment. However, if chromatic dispersion distorts the signal, the original constellation shape no longer holds, meaning that the signal no longer has constant amplitude over time. In this case, the constant-modulus algorithm based chromatic dispersion (CMA-based CD) estimator 50 applies different chromatic dispersion test values to the Frequency Domain Equalizer (FDE) 30, and analyses the Frequency Domain Equalizer (FDE) output signal 40. For a given chromatic dispersion test value, the amplitude of the output signal is constant. In ideal conditions, this corresponds exactly to the opposite value of the chromatic dispersion imposed by the link and thus provides an optical equalization of the signal.

However, the accuracy of the CMA-based CD estimator is affected by different factors. First, as discussed above, the CMA-based algorithm is not agnostic to the modulation format, as it assumes that all constellation symbols have identical amplitudes. This assumption does not apply for many modulation schemes, such as for example Quadrature Amplitude Modulation (QAM) symbols having different amplitudes and phases. Second, since the Frequency Domain Equalizer (FDE) does not compensate polarization-mode dispersion (PMD) and polarization-dependent loss (PDL), these impairments may incorrectly bias the chromatic dispersion estimation. Third, this algorithm does not account for polarization-division multiplexing (PDM).

It should be noted that even though the MIMO equalizer 80 illustrated in FIG. 1 typically has the potential of providing very precise chromatic dispersion estimation, such post-processing estimation requires that the first CMA-based CDE delivers a reasonably small error. However, until the first CMA-based CDE delivers such a small error, a significant amount of time can lapse and frames may be lost.

In summary, a problem related to the CMA-based chromatic dispersion estimator is that the modulation format must define constellation symbols with identical amplitudes. Furthermore, the CMA-based chromatic dispersion estimator lacks robustness against polarization-mode dispersion (PMD) and polarization-dependent loss (PDL) and does not provide for polarization-division multiplexing (PDM), which can only be compensated with high implementation complexity.

The above referenced article by Kuschnerov, Maxim, et al. discloses a CMA algorithm, in which different chromatic dispersion values are tested, and the value which minimizes a defined CMA cost function is, in ideal conditions, the opposite value of the chromatic dispersion of the link. The suggested algorithm has the advantage that the estimation path uses a compensation path, wherein the signal analyzed by the estimator is the Frequency Domain Equalizer (FDE) output signal. However, the algorithm is not modulation format transparent and does not take into account PDM, PMD and PDL. US2012/0213512A1 describes a similar chromatic dispersion equalization.

Hauske, Fabian N., et al. "*Frequency domain chromatic dispersion estimation.*" *Optical Fiber Communication Conference. Optical Society of America*, 2010 discloses an estimator which works in the frequency domain and applies correlation of the input signal spectrum with a circularly-shifted version of itself. Consequently, the respective correlation power is maximized for the correct chromatic dispersion estimation. Although this estimator is transparent to the modulation format, it does not use any signal from the compensation path, leading to an increased implementation complexity. A related version of chromatic dispersion estimation is discussed in Hauske, Fabian N., et al. "*Precise, robust and least complexity CD estimation.*" *National Fiber Optic Engineers Conference. Optical Society of America*, 2011 wherein rather than analyzing the entire spectrum of the input signal, only a clock-tone is analyzed. Consequently, the implementation complexity is reduced, but the clock tone-power can be undesirably affected by polarization-related effects such as PMD and PDL. As a matter of fact, the clock tone-power can even completely vanish in certain scenarios, rendering this estimator useless for PMD impaired input signals. A similar clock-tone based approach for detecting and compensating chromatic dispersion is disclosed in US 2012/0281981A1. Here, a binary signal is modulated in pseudo-RZ modulation, which generates a clock tone in the spectrum.

The receiver monitors the power of such clock tone, which depends on the chromatic dispersion. Hence, this approach represents another clock-tone based technique having the disadvantages discussed above.

Wymeersch, Henk, and Pontus Johannisson. "*Maximum-likelihood-based blind dispersion estimation for coherent optical communication.*" Lightwave Technology, Journal of 30.18 (2012): 2976-2982 discloses a maximum-likelihood chromatic dispersion estimator which works in the frequency domain. This estimator is independent of the modulation format, timing offset, differential group delay (DGD) and input polarization state, and its performance is mathematically proved to be optimal. However, its implementation is very complex as it requires matrix multiplication of an oversampled input signal (more than 2 samples/symbol), and one multiplication is required per each test polarization matrix.

Sui, Qi, Alan Pak Tao Lau, and Chao Lu. "*Fast and Robust Blind Chromatic Dispersion Estimation Using Auto-Correlation of Signal Power Waveform for Digital Coherent Systems.*" *Journal of Lightwave Technology* 31.2 (2013): 306-312 discloses an estimator based on the auto-correlation of signal power waveform, but which does not search for an optimum CD value. In fact, the optimum CD value is directly the result of the estimation. However, in this scheme, the estimation path does not use any signal from the compensation path and the implementation of the estimation path is complex, as it needs a FFT/IFFT pair to calculate the correlation of the signal power waveform in the frequency domain. Furthermore, results presented in the document illustrate that the algorithm is very sensitive to narrowband electrical or optical filtering.

Hauske, Fabian N, et al. "*Optical performance monitoring in digital coherent receivers.*" Lightwave Technology, Journal of 27.16 (2009): 3623-3631 discloses a data-aided algorithm, which estimates the chromatic dispersion from the taps of the MIMO equalizer 80 illustrated in FIG. 1. Thus, the signals analyzed by the estimator are not the output signals of the first Frequency Domain Equalizer (FDE) 30 in FIG. 1, but represent signals processed in a number of steps prior to being analyzed by the estimator. It follows that a useful chromatic dispersion estimation range requires very long training sequences and a very long equalizer impulse response, which can only be solved by highly complex implementations.

U.S. Pat. No. 6,798,500 relates to a method for estimation of chromatic dispersion in a multichannel optical network. Here, the disclosed estimator is based on eye-diagram analysis, wherein the chromatic dispersion distorts the eye diagram of an on-off-keying signal from its original shape. Thus, the method is limited to on-off-keying signals and can only cope with minor chromatic dispersions.

US2013/0045004 relates to a histogram-based chromatic dispersion estimator and is based on the effect that the power waveform of an optical signal subject to chromatic dispersion has a Gaussian-shaped statistical distribution. Thus, the histogram of the amplitude of the optical field is determined, and if the histogram is Gaussian, then it is concluded that the chromatic dispersion has not been properly compensated. In other words, the chromatic dispersion compensator is tuned until the histogram is no longer Gaussian. However, this estimator is applicable only to minor chromatic dispersions.

US20120128376 refers to a method of chromatic dispersion estimation for coherent receivers which is insensitive to polarization-mode dispersion (PMD). The disclosed estimator obtains two frequency parts of the signal at frequencies ±f from the center frequency. The chromatic dispersion is estimated by comparing the phase shift between the frequency parts, which should be zero if no chromatic dispersion is present in the signal. However, as polarization-related effects can additionally influence the spectral phase, this estimator is implicitly sensitive to PMD and PDL, although such influences may be reduced by averaging.

It follows that the above conventional chromatic dispersion estimators are based on time-domain signals (e.g., CMA) or frequency-domain signals (e.g., spectral analysis, clock-tone analysis) and may or may not use signals from the compensation path. However, the above conventional chromatic dispersion estimators are unsuitable or require significant complexity for coping with a modulation format with constellation symbols having unequal amplitudes, especially when the estimator is to additionally provide robustness against polarization-mode dispersion (PMD) and polarization-dependent loss (PDL) and to also account for polarization-division multiplexing (PDM).

SUMMARY OF THE INVENTION

Accordingly, a problem underlying the invention is to provide improved devices and methods for performing chromatic dispersion estimation in optical communication systems, in particular improved devices and methods for coping with modulation format constellation symbols having unequal amplitudes. It is further desired that the respective devices and methods provide robustness against polarization-mode dispersion (PMD) and polarization-dependent loss (PDL) and can account for polarization-division multiplexing (PDM).

This problem is solved by a method of performing chromatic dispersion estimation in a receiver of an optical communication system, and by a receiver for an optical communication system.

The method of performing chromatic dispersion estimation in a receiver of an optical communication system comprises the steps of:

receiving a signal divided into frames, wherein each frame comprises a training portion and a data portion, and wherein the training portion comprises at least two identical pattern sequences, equalizing the received signal such as to generate a plurality of equalized signals each corresponding to a different setting of an equalizer, wherein each of the equalized signals comprises at least one frame, determining a plurality of correlation values, wherein at least one correlation value is calculated for each frame comprising the equalized signal, and wherein each correlation is calculated between a first pattern sequence and a second pattern sequence of the corresponding frame, determining a final correlation value for each of the equalized signals by averaging the plurality of correlation values determined for each of the equalized signals, and selecting the setting of the equalizer corresponding to the equalized signal providing the highest final correlation value.

Hence, the present invention provides a method of performing chromatic dispersion estimation in a receiver, wherein the receiver receives a signal including frames. Each of the frames comprises a training portion and a data portion, and the training portion comprises a plurality of identical pattern sequences. As explained below, the respective pattern sequences are used for estimating the chromatic dispersion of the signal, but may also relate to other tasks, such as for example frame synchronization (also called frame detection), frequency offset estimation and channel estimation. In this way, signal processing units applied for other purposes such as for example frame detection can be reused for performing chromatic dispersion estimation. This applies in particular to reusing correlators for the purpose of frame detection and chromatic dispersion estimation. In other words, common signal processing units are reused for lower implementation complexity, which may for example comprise Digital Signal Processors (DSPs) or ASICs.

In the next step, the received signal is equalized such as to generate a plurality of equalized signals, wherein each of the equalized signals comprises at least one frame. Thus, an equalizer is applied using different settings to the received signal such as to generate a plurality of equalized signals spanning at least one frame. For example, the equalizer may represent a frequency domain equalizer, in particular a chromatic dispersion (CD) equalizer. Then, a plurality of correlation values are determined, wherein at least one correlation value is calculated for each of the respective frames. In this respect, each of the correlation values is obtained by calculating the correlation between a first pattern sequence and a second pattern sequence of the corresponding frame. As mentioned above, the respective pattern sequences are comprised by the training portion and represent identical pattern sequences. Hence, the chromatic dispersion estimation is performed according to the present invention by calculating the correlation between two identical pattern sequences of the equalized signals. In this respect, the correlation between two repetitions of a symbol pattern embedded in the transmit stream is affected by distortions, and thus also by the chromatic dispersion. In particular, an increase of the absolute chromatic dispersion leads to an increased intersymbol interference (ISI), which in turn decreases the calculated correlation, in particular the correlation output power.

In order to improve the accuracy of the calculated correlation values, the method according to the present invention obtains a final correlation value for each of the equalized signals by averaging the plurality of correlation values determined for each of the equalized signals. Then, after calculating the final correlation value for each of the equalized signals, the setting of the equalizer corresponding to the equalized signal providing the highest final correlation value is selected as the optimal setting for compensating the chromatic dispersion of the signal.

It should be noted that for the single purpose of chromatic estimation, it is beneficial for the two identical pattern sequences of the equalized signals not to be contiguous, as more intersymbol interference (ISI) between the training sequences and data would be promoted for the same amount of chromatic dispersion, ultimately leading to higher estimation sensitivity. In other words, it is preferred that the received signal comprises a frame including a training portion and a data portion which are arranged such that the training portion comprises non-contiguous portions separated by parts of the data portion.

Moreover, as the respective correlation between two repetitions of a symbol pattern in accordance with the present invention is not limited to symbols having identical amplitudes, the frames of the received signal may comprise a training portion and/or a data portion including symbols having different amplitudes and phases, in particular QAM modulated symbols. Similarly, the respective correlation approach can also cope with polarization-division multiplexed (PDM) signals, as explained further below.

The step of determining the at least one correlation value for each of the equalized signals may comprise the additional steps of delaying each equalized signal by a time-offset to generate a delayed version of each of the equalized signals, and then calculating the correlation between a first pattern sequence of the delayed equalized signal and a second pattern sequence of the non-delayed equalized signal. In this respect, the delay of the equalized signal may for example be set to correspond to a single or a multiple of the length of a pattern sequence in the training portion of a frame. Thus, the respective at least one correlation value is determined for each frame by calculating the correlation between the delayed and non-delayed versions of each of the equalized signals. In this respect, the step of determining the at least one correlation value for each of the equalized signals may comprise multiplying samples of the non-delayed equalized signal with samples of the delayed equalized signal and calculating a moving average of the multiplied samples. Here, the respective correlation value may for example be determined as the peak power value of a portion of the sequence of power values. This approach to determine the respective correlation values is particularly useful, because the respective calculations can be performed using different types of signal processing units. In particular, as discussed above, correlators of signal processing units may be reused for performing e.g. frame detection as well as chromatic dispersion estimation with low implementation complexity.

The present invention further relates to a receiver for an optical communication system adapted to perform above method steps. In this respect, the receiver according to the present invention comprises:
- an input port adapted to receive a signal divided into frames, wherein each frame comprises a training portion and a data portion, and wherein the training portion comprises at least two identical pattern sequences,
- an equalizer adapted to equalize the received signal to generate a plurality of equalized signals each corresponding to a different setting of the equalizer,
- a correlation unit adapted to determine correlation values for each of the equalized signals by calculating each correlation value between a first pattern sequence and a second pattern sequence of each frame included in the equalized signal,
- an averaging unit adapted to provide a final correlation value by averaging the correlation values calculated for each of the equalized signals, and
- a selection unit adapted to select the setting of the equalizer corresponding to the equalized signal providing the highest final correlation value.

As discussed above, the frames of the received signal may comprise a training portion and/or a data portion including symbols having different amplitudes and phases, in particular QAM modulated symbols. In this respect, the receiver can further comprise a demodulator adapted to demodulate the equalized signal or a signal derived from the equalized signal, in particular a QAM demodulator for demodulating symbols having different amplitudes and phases. Similarly, the equalizer is preferably adapted to compensate chromatic dispersion (CD) wherein the received signal may represent a polarization-division multiplexed (PDM) signal.

In a preferred embodiment, the receiver according to the present invention comprises a frame detection unit configured to receive the equalized signal provided by the equalizer. In particular, the frame detection unit may be adapted to detect a training portion, calculate the correlation between the training portion and a delayed version of the training portion to determine power values, and may be further adapted to determine the correlation value corresponding to the peak power value of the determined power values and to output the determined correlation value to the selection unit. Since the frame detection unit calculates correlations too, the aforementioned correlation unit as employed for the estimation of chromatic dispersion and the frame detection unit may share signal processing units or calculation units, thereby lowering the implementation complexity.

Note that in the present disclosure, the term "unit" as used in "correlation unit", "frame detection unit" or "frequency offset estimation unit" shall be understood in a broad sense and can have a purely functional meaning. In other words, a "unit" may or may not be a discrete or separated entity. For example, a "unit" may be broadly represented by certain functionalities provided by a digital signal processor under corresponding program control, which at the same time may provide other functionalities and hence represent other "units".

In another preferred embodiment, the receiver according to the present invention comprises a frequency offset estimation unit configured to receive the equalized signal provided by frame detection unit. Similarly to the preferred embodiment above, this is particularly useful for sharing signal processing units between the frequency offset estimation unit and the chromatic dispersion estimation unit, such as to lower the implementation complexity. In particular, the receiver may comprise computing circuits which are shared between the correlation unit and the frequency offset estimation unit, wherein the frequency offset estimation unit is adapted to calculate a correlation between the training portion and a delayed version of the training portion to determine the phase of peak values, and wherein the frequency offset estimation unit is further adapted to determine the correlation value corresponding to the power of the determined peak value and to output the determined correlation value to the selection unit.

It follows that both the method and receiver according to the present invention are advantageous, in particular for providing transparency to the modulation format, low implementation complexity, insensitivity to polarization-mode dispersion (PMD) and polarization-dependent loss (PDL), and in order to account for polarization-division multiplexing (PDM). Furthermore, as discussed below, the method and receiver according to the present invention allow to trade-off estimation range for estimation accuracy. More specifically, a larger estimation range is obtained for a longer correlation length, whereas better accuracy is obtained for a shorter correlation length.

SHORT DESCRIPTION OF THE FIGURES

Figure 2:
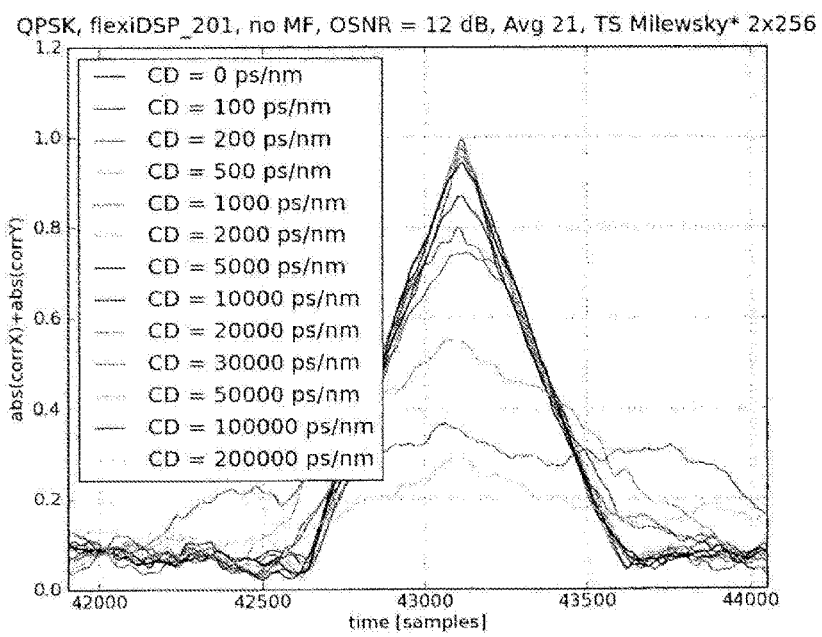
Figure 3:
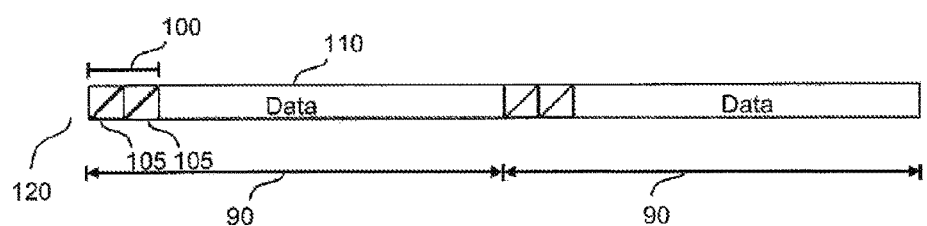
Figure 4:
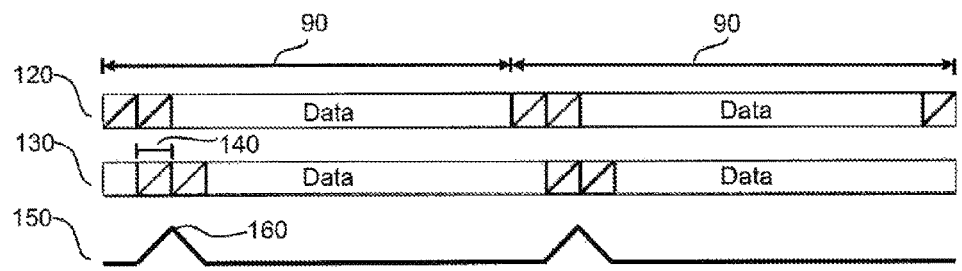
Figure 5:
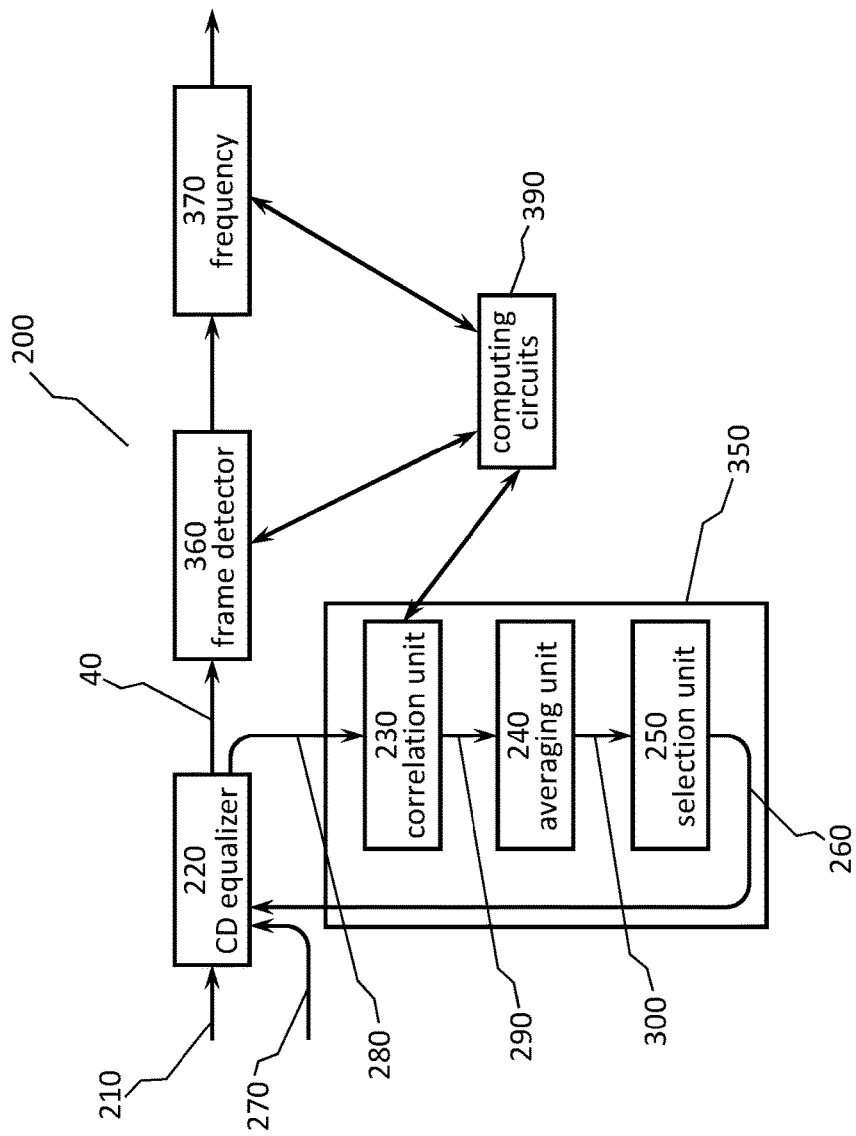
Figure 6:
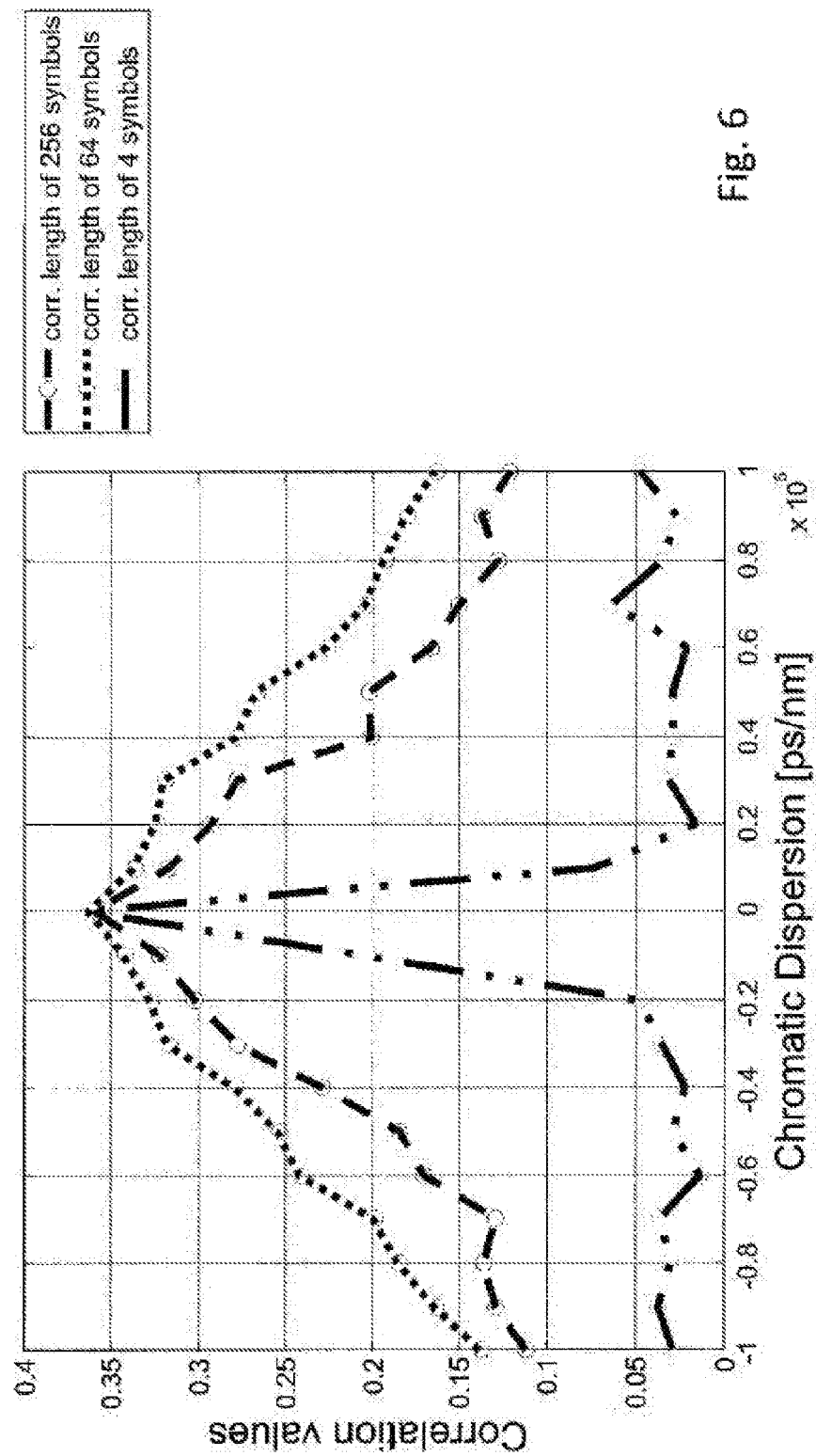

FIG. 1 is a schematic illustration of a digital signal processing (DSP) architecture of a channel estimator comprising a frequency domain equalizer (FDE), frame detector, frequency offset correction, MIMO equalizer and a CMA-based chromatic dispersion estimator, FIG. 2 is a graphical presentation of triangular correlation peaks obtained by calculating the correlation between two identical pattern sequences of a received signal subject to different levels of chromatic dispersion, FIG. 3 is a schematic illustration of a received signal divided into frames each comprising a training portion including two identical pattern sequences and a data portion, FIG. 4 is a schematic illustration of a correlation value being determined for each frame by calculating the correlation between a first pattern sequence of a delayed version of an equalized signal and a second pattern sequence of a non-delayed version of the same equalized signal, FIG. 5 is a schematic illustration of a receiver comprising an input port, equalizer, correlation unit, averaging unit and a selection unit, FIG. 6 is a graphical presentation of triangular correlation peaks representing correlation power as a function of different correlation lengths.

DESCRIPTION OF THE PREFERRED EMBODIMENTS

For the purposes of promoting an understanding of the principles of the invention, reference will now be made to the preferred embodiments illustrated in the drawings and specific language will be used to describe the same. It will nevertheless be understood that no limitation of the scope of the invention is thereby intended, such alterations and further modifications in the illustrated devices and method and such further applications of the principles of the invention as illustrated therein being contemplated therein as would normally occur now or in the future to one skilled in the art to which the invention relates.

The chromatic dispersion estimation according to the present invention is obtained by calculating the correlation between two identical pattern sequences of signals which have been received and equalized. In this respect, the correlation between two repetitions of a symbol pattern embedded in the transmit stream is affected by distortions, and thus also by the chromatic dispersion. Hence, an increase of the chromatic dispersion leads to an increased intersymbol interference (ISI), which in turn decreases the calculated correlation, in particular the correlation output power.

FIG. 2 provides a graphical presentation of triangular correlation peaks which are obtained by calculating the correlation between two identical pattern sequences which are affected by different levels of chromatic dispersion. It is clear from FIG. 2 that the maximum amplitude of the triangular correlation peaks (representing the correlation output power) gets smaller for higher levels of chromatic dispersion. In other words, the level of chromatic dispersion present in a signal can be estimated by performing a correlation between two identical pattern sequences included in the signal.

FIG. 3 illustrates a corresponding signal 120 being received by a receiver in accordance with the present invention. The signal 120 is divided into frames 90 each comprising a training portion 100 and a data portion 110. In this example, the training portion 100 includes two identical pattern sequences 105, each with L samples. In this example, the pattern sequences 105 could also be used for frame synchronization and frequency offset estimation, among other tasks. However, as mentioned above, for the single purpose of chromatic dispersion estimation, it is beneficial for the two segments 105 of the training portion 110 not to be contiguous, as more intersymbol interference (ISI) between the training sequences and data would be promoted for the same amount of chromatic dispersion, ultimately leading to higher estimation sensitivity.

FIG. 4 illustrates a scheme for calculating the correlation between the two identical pattern sequences shown in FIG. 3. Here, a correlation value is determined for each frame 90 by calculating the correlation between a first pattern sequence of a delayed version of the signal 130 and a second pattern sequence of a non-delayed version of the same signal 120. In this example, the delayed version of the signal 130 has been delayed by L samples with respect to the non-delayed version of the same signal 120, corresponding to the length of one of the pattern sequences. Consequently, the overlapping samples 140 in the training portion 100 shown in FIG. 4 represent the above two identical pattern sequences included in each of the frames 90.

In FIG. 4, correlation values 150 are obtained by calculating the correlation between the first pattern sequence of a delayed version of the signal 130 and the second pattern sequence of a non-delayed version of the same signal 120. In this example, the correlation is performed using a receding time-horizon, wherein the corresponding samples of the delayed and non-delayed signals 120, 130 are multiplied and added to perform a moving average in a receding time-horizon. Here, the receding time-horizon and thus the moving average has the length of L samples. Since data is essentially a random signal, correlated samples do not add-up constructively in the moving average, but average out instead during the data portions 110. However, this is not the case for the training portion 100. As shown in FIG. 4, the correlator outputs L samples in the overlapping portion 140 which show that the respective multiplied samples of the delayed and non-delayed signals add-up constructively. It follows that a triangular peak 160 with length 2L is obtained at the output of the moving average. As discussed above with reference to FIG. 2, the magnitude of the triangular peak 160 represents the correlation output power and thus serves as an indicator for the level of chromatic dispersion included in the signal 120.

FIG. 5 illustrates how this correlation scheme can be used in a receiver 200 according to an embodiment of the present invention. More specifically, FIG. 5 is a schematic illustration of a receiver 200 comprising an input port 210, equalizer 220, correlation unit 230, averaging unit 240 and a selection unit 250 which in combination form a CD estimation unit 350 replacing the CD estimation unit 50 shown in FIG. 1. As discussed above, the signal received at the input port 210 is divided into frames 90, each comprising a training portion 100 and a data portion 110. In this example, the training portion 100 comprises two identical pattern sequences. Then, different settings 270 are applied to the equalizer 220 to generate a plurality of equalized signals 280. The plurality of equalized signals 280 is forwarded in parallel or sequentially to a correlation unit 230, which as described above determines correlation values for each of the equalized signals by calculating correlation values 290 between the first and second pattern sequences of each frame 90. The averaging unit 240 receives the correlation values 290 from the correlation unit 230 and provides a final correlation value 300 for each of the equalizer settings 270 by averaging the peaks 160 of correlation values 290 calculated for each of the equalized signals 280. Finally, the selection unit 250 receives the final correlation values 300 for each of the equalizer settings 270 and selects the setting 260 of the equalizer 220 corresponding to the equalized signal 280 providing the highest final correlation value 300. Hence, by selecting the equalizer setting 260 corresponding to the highest final correlation value 300, the selected equalizer setting 260 minimizes the chromatic dispersion of the signal 280 output by the equalizer 220 and thus provides a chromatic dispersion estimation in the receiver.

As is further shown in FIG. 5, the selected equalizer setting 260 can be communicated to the CD equalizer 220 to be used for equalization of receive signals.

As is further shown in FIG. 5, the receiver 200 comprises a frame detection unit 360 configured to receive the equalized signal 40 provided by the equalizer 220. In particular, the frame detection unit 360 may be adapted to detect a training portion, calculate the correlation between the training portion and a delayed version of the training portion to determine power values.

Since the frame detection unit 360 calculates correlations too, the aforementioned correlation unit 320 as employed for the estimation of chromatic dispersion and the frame detection unit 360 may share signal processing units or calculation units, thereby lowering the implementation complexity. In particular, the frame detection unit 360 may be adapted to determine the correlation value corresponding to the peak power value of the determined power values and to output the determined correlation value to the selection unit 250. This way, the correlation unit 230 may not need to be additionally provided.

With further reference to FIG. 5, the receiver 200 comprises a frequency offset estimation unit 370 configured to receive the equalized signal provided by frame detection unit 360. The frequency offset estimation unit is adapted to calculate a correlation between the training portion and a delayed version of the training portion to determine the phase of peak values of its own. Again, it is possible to share signal processing units between the frequency offset estimation unit 370 and the apparatus for chromatic dispersion estimation, such as to lower the implementation complexity.

In particular, the receiver 200 may comprise computing circuits 390 which are shared between the correlation unit 320 and the frequency offset estimation unit 370, wherein the frequency offset estimation unit 370 is further adapted to determine the correlation value corresponding to the power of the determined peak value and to output the determined correlation value to the selection unit 250.

In other words, the chromatic dispersion estimate can be performed in accordance with the present invention by observing the maximum power of the triangular peak 160 for a given set of CD test values representing different equalizer settings 270 and choosing the value corresponding to the maximum peak amplitude. However, the amplitude of the triangular peak 160 illustrated in FIG. 2 does not only depend on the chromatic dispersion, but also on other parameters, such as the power of the input signal, optical signal-to-noise ratio (OSNR), phase noise, PMD. Nevertheless, although an undistorted, noiseless signal leads to maximized peak power, these additional affects can be shown to be constant or to have a negligible effect. For example:

- The input power can typically be assumed as constant over time, in particular where automatic gain controllers (AGCs) are arranged before the equalizer 220. Even if this is not the case for a given receiver architecture, the effect of varying input power could be excluded by reusing a stored version of the input signal over and over again for the whole set of the respective chromatic dispersion test values.
- The impact of noise is significantly mitigated in three ways. First, the respective moving average 240 is essentially a low-pass filter, which filters-out noise. Second, the signal to noise ratio can typically be assumed to be constant over each chromatic dispersion estimation, which means that even though all triangular peaks 160 have a lower amplitude for higher levels of noise, the highest final correlation value is nonetheless obtained for the correct equalizer setting 270 which represents the most appropriate estimation of the chromatic dispersion. Third, depending on the specified minimum signal to noise ratio, the number of frames equalized for the same equalizer setting 270 can be increased, thereby increasing the number of correlation values 290 for each equalizer setting 270, and consequently producing a final correlation value 300 which is better averaged-out from noise.
- Phase noise is a slow process compared to Amplified Spontaneous Emission (ASE) noise, and it is usually not as important as ASE noise. Hence, it can be neglected during the correlation length for realistically low laser linewidths.
- A constant frequency offset introduces a phase rotation in the output signal of the correlator. Hence, a frequency offset has no impact on the amplitude of the correlation peak.
- Data-aided polarization demultiplexing requires different preambles for each polarization. The data frame preambles of each polarization must be orthogonal in order to allow polarization demultiplexing. For the case of constant amplitude zero autocorrelation (CAZAC) training sequences, such orthogonality can be for example obtained by introducing a cyclic shift of L/2 samples between the preambles used in the two polarizations. The tolerance of MIMO equalization to Differential Group Delay (DGD) therefore becomes L/2 samples, which by design must be sufficient for any relevant transmission link. In practice, the DGD impulse response is usually much shorter than L/2. Due to PMD or to a simple polarization rotation, the signal received at the input port 210 can be described as a weighted addition of the received signals from each polarization. Hence, there is also a weighted addition of the preambles from each polarization. Since for realistic values of PMD the orthogonality of both preambles is preserved, the correlation of the now added preambles gives the same result as performing separate correlations for each polarization, and then adding the two correlation values. Consequently, the correlation peak power is independent of any polarization rotation and also of PMD.
- Polarization-dependent loss (PDL) may result in loss of orthogonality between both preambles which belong to different polarizations. Nonetheless, such loss of orthogonality is critical only for polarization demultiplexing. Concerning the correlation peak power, it only has a reducing effect, independently of the equalizer setting 270. Therefore, the impact of PDL on the correlation peak power is negligible.

Thus, it follows from above that the chromatic dispersion estimation according to the present invention has a number of advantages. In particular,
1. it is transparent to the modulation format;
2. it can be provided with negligible implementation complexity, as the estimation can be based on sharing resources with other units of the receiver, such as for example frame detector modules used in a DSP architecture; and
3. it is insensitive to polarization rotation and PMD, and very robust against PDL.

In addition to the above advantages, the chromatic dispersion estimation according to the present invention allows to trade-off estimation range for estimation accuracy. In other words, a larger estimation range is obtained for a longer correlation length, whereas better accuracy is obtained for a shorter correlation length. It follows that the accuracy of the chromatic dispersion estimation algorithm depends on the correlation length. A shorter correlation length leads to a higher sensitivity with respect to the chromatic dispersion. However, a shorter correlation length also results in reduced robustness to noise. With this in mind, the training portion or preamble should allow a short correlation length, have a sufficient number of symbols suitable for correlation for a matter of noise robustness, and still consist of two identical segments as required by e.g. the frame detector. All these specifications can be accomplished by subdividing the training portion into a higher number of identical pattern sequences. For example, the training portion can be subdivided into eight identical pattern sequences, wherein each of the identical pattern sequences may comprise e.g. 64 symbols. In this way, the correlation length can be adjusted as required.

FIG. 6 illustrates the respective triangular correlation peaks as a function of different correlation lengths. It is clear from the figure that the correlation of length 4 has the highest sensitivity with respect to identifying the correct chromatic dispersion value. However, as mentioned above, a shorter correlation length also results in reduced robustness to noise.

As mentioned above, the chromatic dispersion estimation according to the present invention can be provided with negligible implementation complexity, as the estimation can be based on sharing resources with other units of the receiver, such as for example frame detector modules already used in a DSP architecture. Thus, modules for performing correlations may be available in e.g. frame detection and data-aided frequency offset estimation units, and may thus be efficiently reused for implementing the above chromatic dispersion estimation scheme.

Moreover, using training symbols allows unambiguous stream separation independently of the number of tributaries. This reduces the complexity of the receiver and is also required in systems supporting more than two tributaries (e.g. migrating from PDM to multi-mode systems with more than two parallel streams).

The embodiments described above and the accompanying figures merely serve to illustrate the method and devices according to the present invention, and should not be taken to indicate any limitation thereof. The scope of the patent is solely determined by the following claims.

LIST OF REFERENCE SIGNS 10 channel estimator
20 optical signal
30, 220 equalizer
40, 280 equalized signal
50 chromatic dispersion estimator
60 frame detection
70 frequency offset correction
80 MIMO equalization
90 frame
100 training portion
105 pattern sequence
110 data portion
120 received signal or equalized signal
130 delayed signal or delayed equalized signal
140 overlapping samples in the training portion
150 correlation values
160 triangular correlation peak
200 receiver
210 input port
230 correlation unit
240 averaging unit
250 selection unit
260 equalizer setting corresponding to highest final correlation value
270 equalizer settings
290 correlation values
300 final correlation value

The invention claimed is:

1. A method of selecting a setting of an equalizer in a receiver of an optical communication system for compensating for chromatic dispersion in a received signal, comprising the steps of:
    receiving a signal divided into frames, wherein each frame comprises a training portion and a data portion, and wherein the training portion comprises at least two identical pattern sequences,
    equalizing the received signal such as to generate a plurality of equalized signals, each corresponding to a different setting of an equalizer, wherein each of the equalized signals comprises at least one frame,
    determining a plurality of correlation values, wherein at least one correlation value is calculated for each frame comprising the equalized signal, and wherein each correlation value is calculated between a first pattern sequence and a second pattern sequence of the corresponding frame,
    determining a final correlation value for each of the equalized signals by averaging the plurality of correlation values determined for each of the equalized signals, and
    selecting the setting of the equalizer corresponding to the equalized signal providing a highest final correlation value.

2. The method according to claim 1, wherein determining at least one correlation value for each of the equalized signals comprises:
    generating a delayed version of each of the equalized signals by delaying each equalized signal constituting a non-delayed version by a time-offset,
    determining at least one correlation value for each frame of the delayed and non-delayed versions of each of the equalized signals by calculating the correlation between a first pattern sequence of the delayed version of the equalized signal and a second pattern sequence of the version of the non-delayed equalized signal.

3. The method according to claim 2, wherein determining at least one correlation value or each of the equalized signals comprises multiplying samples of the non-delayed version of the equalized signal with samples of the delayed version of the equalized signal and calculating a moving average of the multiplied samples.

4. The method according to claim 3, wherein calculating the moving average provides a sequence of power values and wherein a correlation value is determined as a peak power value of a portion of the sequence of power values.

5. The method according to claim 2, wherein the time-offset used to delay the equalized signal corresponds to a multiple of the length of a pattern sequence in the training portion of a frame.

6. The method according to claim 1, wherein the pattern sequences comprised in the training portion of a frame represent training sequences used for channel estimation and/or frame detection and/or frequency offset estimation.

7. The method according to claim 1, wherein the equalizer is a frequency domain equalizer.

8. The method according to claim 1, wherein frames of the received signal comprise symbols having different amplitudes and phasesor wherein the received signal represents a polarization-division multiplexed (PDM) signal.

9. The method according to claims 1, further comprising the step of calculating the correlation values by a frame detection unit.

10. The method according to claim 1, further comprising the step of calculating the correlation values by a frequency offset estimation unit.

11. The method according to claim 1, wherein for at least one of the frames of the received signal the training portion comprises non-contiguous portions separated by parts of the data portion.

12. A receiver for an optical communication system, comprising:
    an input port adapted to receive a signal divided into frames, wherein each frame comprises a training portion and a data portion, and wherein the training portion comprises at least two identical pattern sequences,
    an equalizer adapted to equalize the received signal to generate a plurality of equalized signals, each corresponding to a different setting of the equalizer,
    a correlation unit adapted to determine correlation values for each of the equalized signals by calculating each correlation value between a first pattern sequence and a second pattern sequence of each frame included in the equalized signal,
    an averaging unit adapted to provide a final correlation value by averaging the correlation values calculated for each of the equalized signals, and a selection unit adapted to select the setting of the equalizer corresponding to the equalized signal providing a highest final correlation value.

13. The receiver according to claim 12, further comprising a frame detection unit configured to receive the equalized signal provided by the equalizer, wherein the frame detection unit is preferably adapted to detect the training portion, calculate the correlation between the training portion and a delayed version of the training portion to determine power values, and wherein the frame detection unit is further adapted to determine the correlation value corresponding to the peak power value of the determined power values and to output the determined correlation value to the selection unit.

14. The receiver according to claim 12, further comprising computing circuits which are shared between the correlation unit and one of the frame detection unit or a frequency offset estimation unit.

15. The receiver (100) according to claim 12, wherein the equalizer is adapted to compensate chromatic dispersion (CD) in a received polarization-division multiplexed (PDM) signal.

\* \* \* \* \*